United States Patent [19]
Davis et al.

[11] 3,838,892
[45] Oct. 1, 1974

[54] ADAPTIVE BRAKING SYSTEM

[75] Inventors: Dennis J. Davis; John E. Juhasz; Ralph G. Eslinger, all of Elyria, Ohio

[73] Assignee: The Bendix Corporation, South Bend, Ind.

[22] Filed: Oct. 31, 1972

[21] Appl. No.: 302,633

[52] U.S. Cl.............................. 303/21 P, 303/20
[51] Int. Cl.............................................. B60t 8/12
[58] Field of Search ............... 188/181; 303/20, 21; 324/161–162; 340/52 R, 53, 262

[56] References Cited
UNITED STATES PATENTS

| | | | |
|---|---|---|---|
| 3,017,145 | 1/1962 | Yarber | 188/181 A X |
| 3,398,995 | 8/1968 | Martin | 303/21 BE |
| 3,578,819 | 5/1971 | Atkins | 188/181 A X |
| 3,640,588 | 2/1972 | Carp et al. | 303/21 P |
| 3,642,329 | 2/1972 | Zechnall et al. | 188/181 A X |
| 3,677,609 | 7/1972 | Davis et al. | 188/181 A X |
| 3,704,043 | 11/1972 | Hickner et al. | 188/181 A X |

Primary Examiner—Duane A. Reger
Assistant Examiner—Stephen G. Kunin
Attorney, Agent, or Firm—Ken C. Decker; William N. Antonis

[57] ABSTRACT

An adaptive braking system for an automotive vehicle is disclosed which includes a duty-cycle generator that generates a control signal for actuating a solenoid valve which controls braking pressure in the vehicle's brake actuators. The duty-cycle generator produces a pulsed output which actuates the solenoid valve; the width of the pulses being modulated so that rather precise control of the braking pressure is attained. The width of the pulses is determined by input signals representing wheel acceleration, wheel slip, and an error term. The adaptive braking cycle is initiated whenever wheel acceleration drops below a predetermined low deceleration level, or when wheel deceleration is maintained in a band between two deceleration levels for a sufficient time period. On the other hand, adaptive control of the vehicle's brakes is terminated whenever uninhibited fluid communication to the brake actuators is required or when wheel speed drops below a predetermined low reference guide.

20 Claims, 6 Drawing Figures

ADAPTIVE BRAKING SYSTEM

BACKGROUND OF THE INVENTION

This invention relates to an adaptive braking system for an automotive vehicle.

Many adaptive braking systems for vehicles having fluid pressure operated brakes have been proposed. Most of these systems suffer from serveral disadvantages. Usually, these adaptive braking systems have been quite expensive since they require a number of sophisticated fluid pressure brake modulators, and further require a rather complicated electronic control system. Furthermore, prior art adaptive braking system have provided, in general, only a very rough control of the vehicle's brakes. For example, many of the prior art adaptive braking systems initiate a brake pressure decay at a substantially constant decay rate whenever the controlled wheel decelerates below a predetermined reference level and terminate the substantially constant decay rate and initiate a substantially constant build cycle whenever the wheel reaccelerates past some predetermined acceleration level. Obviously, if braking pressure is decayed or built at a substantially constant rate, precise braking control cannot be obtained. Prior art systems, in general, cannot decay brake pressure quickly enough under some braking conditions in order to prevent wheel lock-up, or they decay braking pressure too fast, so that brake efficiency and stoppin distance is sacrificed.

SUMMARY OF THE INVENTION

Therefore, an important object of our invention is to provide an adaptive braking system which generates a pulse-width modulated output signal which controls brake application and release during an adaptive braking cycle.

Another important object of our invention is to provide adaptive braking logic which generates a pulsed output, with the width of the pulses being governed by a number of input conditions, such as wheel acceleration, wheel slip, and an input representing an error term.

Another important object of our invention is to provide an adaptive braking system which permits more precise control of the brake pressure level than was possible in prior art devices.

DETAILED DESCRIPTION

Figure 1:
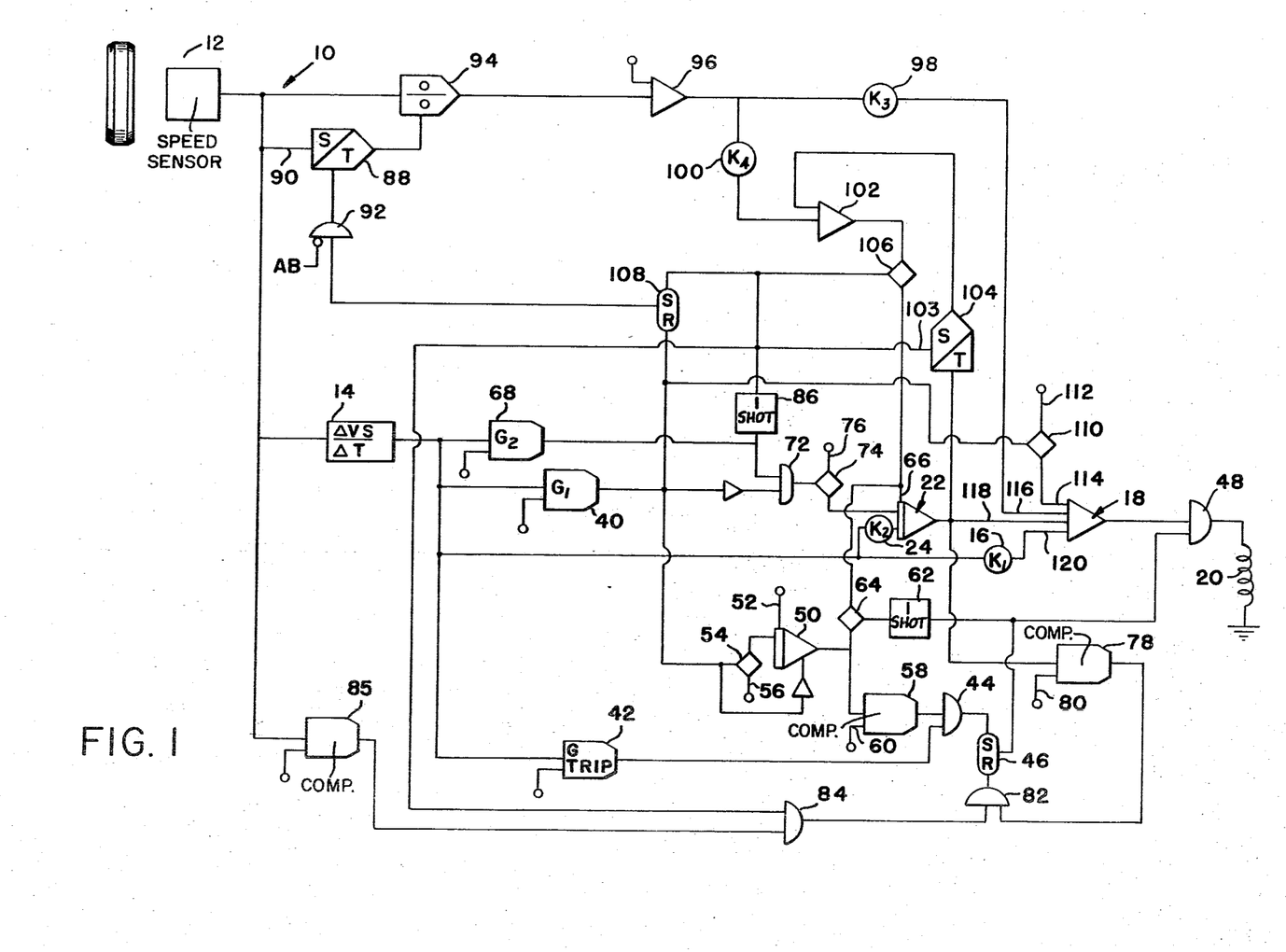
FIG. 1 is a functional block diagram of an adaptive braking system made pursuant to the teachings of our present invention.

Referring now to FIG. 1 of the drawings, an adaptive braking system generally indicated by the numeral 10 includes a wheel speed sensor 12 which generates an output speed signal proportional to the velocity of the controlled wheel. The wheel speed sensor 12 may be of any conventional electromagnetic design well known to those skilled in the art. The speed signal is differentiated in a differentiator 14 to produce a signal proportional to wheel acceleration and deceleration. The output signal of the differentiator 14 is multiplied by a constant $K_1$ in a multiplier 16, the output of which is transmitted to a duty-cycle generator generally indicated by the numeral 18. The duty-cycle generator 18 will be described in detail hereinafter, but in general, the duty-cycle generator 18 produces a pulsed output signal, the width of the pulses being modulated in accordance with the values of a plurality of input signals to the duty-cycle generator 18. The duty-cycle generator 18 includes a summer for summing the values of the signals from the plurality of sources, and the duty-cycle generator thereafter regulates the width of the pulses in accordance with the sum of the values of these signals. Of course, one of the input signals to the duty-cycle generator 18 is the wheel acceleration signal just referred to. In order to rationalize the values of the input signals to the duty-cycle generator 18, it is necessary to multiply the inputs by a constant factor, such as the constant $K_1$ by which the output of the differentiator 14 is multiplied. The pulsed output produced by the duty-cycle generator 18 actuates a solenoid indicated generally at 20, details of which will be further described herewithin.

A second input to the duty-cycle generator 18 is the output signal of an error term generator generally indicated by the numeral 22. The generator 22 is merely an integrating amplifier which integrates an input signal with respect to time and therefore provides an output signal which is averaged over a time period. Such integrating amplifiers are well known to those skilled in the art. One input to the error term generator 22 is also the output of the differentiator 14, multiplied by a constant $K_2$ in a multiplier 24. Therefore, the output of the error signal generator 22 will be proportional to the time average of the wheel acceleration and deceleration, and hence represents the history of wheel acceleration and deceleration.

Figure 2:
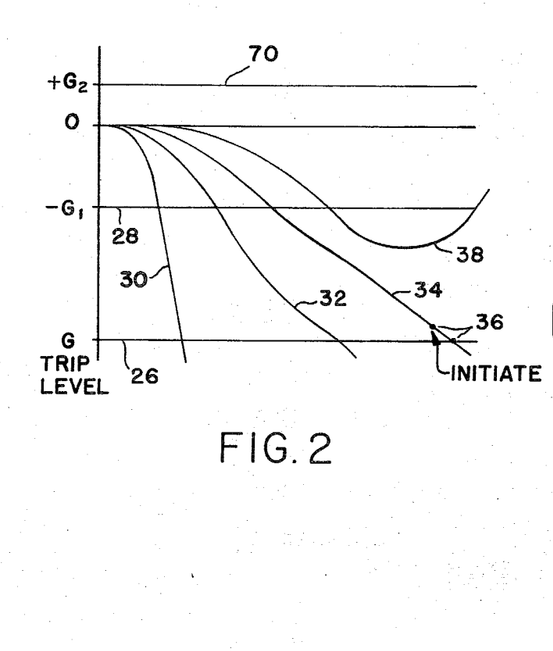
FIG. 2 is a graphical illustration of the operation of our system when an adaptive braking cycle is initiated.

Referring to FIG. 2, an adaptive braking cycle is initiated whenever the wheel deceleration, as represented by the output signal from the differentiator 14, drops below the $G_{trip}$ level represented graphically by line 26 in FIG. 2. Adaptive control is also initiated when the wheel deceleration level remains in the band defined between the $G_{trip}$ level and a $G_1$ level, which represents a deceleration level higher than the $G_{trip}$ level, for a predetermined time period. Furthermore, the initial condition set on the error term generator or integrating amplifier 22, and therefore the initial value of the output signal from the amplifier 22, is governed by the length of time that the wheel deceleration signal produced by the differentiator 14 remains in the band defined between the $G_{trip}$ level 26 and the $G_1$ deceleration level represented by the line 28 in FIG. 2. The $G_1$ deceleration level is below zero deceleration, and is higher than the $G_{trip}$ level represented by the line 26. For example, in the deceleration curve represented by the numeral 30 in FIG. 2, the wheel deceleration drops rather quickly from the $G_1$ level to the $G_{trip}$ level, so that a rather high initial condition is set on the integrating amplifier 22. Since the output of the duty-cycle generator 18 is dependent upon the magnitude of the output signal of the integrating amplifier 22, the pulsed output of the duty-cycle generator 18 will maintain the solenoid 20 on for a substantial portion of each cycle of the output signal of the generator 18. Therefore, the vehicle braking pressure will be decreased at a rather rapid rate. On the other hand, the wheel deceleration cycle represented by the line 32 in FIG. 2 requires a substantially longer time to decrease from the $G_1$ level to the $G_{trip}$ level than does the line 30. Therefore, a much lower initial condition will be set on the integrating amplfier 22, and consequently the solenoid 20 will remain on for a lesser percentage of the time of each cycle and consequently the braking pressure will be decayed at a lesser rate. On the other hand, the wheel deceleration represented by line 34 in FIG. 2 remains in the aforementioned band for a sufficient length of time that an adaptive braking cycle is initiated when wheel deceleration decreases to a level represented by point 36, so that an adaptive braking cycle is initiated before wheel deceleration drops below the $G_{trip}$ level. The initial condition set on the integrating amplifier in this case would be even less than the initial condition set by the cycle represented by the line 32 in FIG. 2, and consequently the solenoid 20 would remain on for an even smaller proportion of each cycle of the output of generator 18. In all cases, it should be noted that the solenoid 20 will be cyclically turned on and off, but the percentage of the time that it remains on as compared to the percentage that the solenoid 20 is off will vary depending on the output of the duty-cycle generator 18. Since the wheel deceleration represented by the curve 38 in FIG. 2 neither decreases below the $G_{trip}$ level nor remains below the $G_1$ level for the predetermined time period, no adaptive braking cycle would be initiated in this case.

The output signal from the differentiator 14 is transmitted to a first comparator 40 which compares the value of the output signal to the differentiator 14 with a deceleration reference level corresponding to the $G_1$ level illustrated by line 28 on FIG. 2. The output of differentiator 14 is also transmitted to the input of another comparator 42, which compares the value of the output signal with a value representing the $G_{trip}$ acceleration level illustrated by the line 26 in FIG. 2. Assuming that the value of the output of the differentiator 14 does drop below the $G_{trip}$ level causing comparator 42 to produce an output signal, this output signal is transmitted to one input of an OR gate 44, causing the latter to produce an output signal which sets a flip-flop 46. The flip-flop 46 produces an output signal which is transmitted to an AND gate 48. The other input of the AND gate 48 is connected to the output of the duty-cycle translator 18. Therefore, if the duty-cycle translator 18 is producing an output signal when the flip-flop 46 is producing an output signal, which should always be the case in the absence of a system malfunction, the solenoid 20 will be actuated. This is the manner in which the adaptive braking cycles represented by curves 30 and 32 in FIG. 2 are initiated.

Of course, when the output of differentiator 14 decreases below the $G_1$ reference level represented by line 28 in FIG. 2, which obviously occurs prior to its dropping below the $G_{trip}$ reference level represented by line 26 in FIG. 2, the comparator 40 produces an output signal. The output signal of the comparator 40 initiates operation of integrating amplifier indicated by the numeral 50. The initial value of the output of the integrating amplifier 50 is established at the initial condition terminal 52, which is connected with an electrical potential of a predetermined value. The output signal from the comparator 40 closes a switch 54, which causes the integrating amplifier 50 to decay the value of its output signal in a predetermined manner governed by the signal at the terminal 56 of the switch 54. The output signal of the integrating amplifier 50 is transmitted to a comparator 58 which compares the value of the output signal of the integrating amplifier 50 with a predetermined reference value transmitted to the terminal 60 of the comparator 58. When the output of the integrating amplifier 50 is decayed below the reference signal established at the terminal 60 of comparator 58, the latter produces an output signal which is transmitted to an input of the OR gate 44. Therefore, OR gate 44 will produce an output signal which sets the flip-flop 46 in the manner described above. Since the other input of the OR gate 44 is the output of the comparator 42, the flip-flop 46 will be set when the output of the comparator 42 produces an output signal, which is the case when a cycle proceeds according to the curves 30 and 32 on FIG. 2, or when the comparator 58 produces an output signal, as is the case when the adaptive braking cycle proceeds according to curve 34 on FIG. 2. The output signal of the flip-flop 46 is not only transmitted to the AND gate 48, but also pulses a one-shot multivibrator 62. The output of the one-shot 62 closes a switch 64, thereby transmitting the value of the output signal of the integrating amplifier 50 to the initial condition terminal 66 of the error term generator 22. Therefore, whenever an adaptive braking control is initiated, the initial value of the output of the error term generator 22 is governed by the value of the output signal of the integrating amplifier 50. Since the output signal of the latter is governed by the length of time that the wheel acceleration signal remains in the band defined between the $G_1$ an $G_{trip}$ deceleration levels, the initial value of the output of the error term generator 22 will also be a function of this time period.

The output of the differentiator 14 is also transmitted to the input of another comparator generally indicated by the numeral 68. The comparator 68 compares the value of the output signal of the differentiator 14 with a $G_2$ reference level and produces an output signal whenever the value of the wheel acceleration drops below the $G_2$ reference level. The $G_2$ reference level represents a slightly positive acceleration level, as represented by the line 70 in FIGS. 2 and 3. The output of the comparator 68 is transmitted to an input of an AND gate 72, the other input of which is connected to the inverted output signal of the comparator 40. Therefore, the AND gate 72 will produce an output signal whenever the wheel deceleration is in a band defined between the $G_1$ and $G_2$ acceleration and deceleration levels, as represented by the lines 28 and 70 in FIG. 2. The output of the AND gate 72 closes a switch 74, which transmits a signal at the terminal 76 to the negative input of the error term generator 22. Therefore, as long as the wheel deceleration level remains in the band between the $G_1$ deceleration level and the $G_2$ acceleration level, the output of the error term generator will be decay at some predetermined rate governed by the value of the signal at the terminal 76. This value is set at a rather high level, so that the output signal of the error term generator 22 decays at a very fast rate as long as the switch 74 is closed.

The output of the error term generator 22 is transmitted to a comparator 78, which compares the value of the output signal of the generator 22 with some predetermined reference values established at the terminal 80 of the comparator 78. When the value of the output of error term generator 22 falls below the value of the terminal 80, comparator 78 generates an output signal which is transmitted to an OR gate 82. OR gate 82 then generates an output signal which is transmitted to the reset input of the flip-flop 46, thereby causing the latter to terminate the control signal to the solenoid 20. it will be noted that the value of the output signal of the error term generator 22 will fall below the value of the signal at the terminal 80 a relatively short time after the switch 74 is closed. Therefore, the adaptive braking cycle is terminated rather quickly when the value of the wheel deceleration signal remains in the band between the wheel deceleration between the $G_1$ deceleration level and $G_2$ acceleration level. However, the value of this signal is permitted to pass through this band during a wheel acceleration or deceleration without terminating the cycle. The value of the signal at the terminal 76 must therefore be adjusted accordingly.

The other input of the OR gate 82 is connected to the output of an AND gate 84. One of the inputs to the AND gate 84 is connected to the output of a one-shot 86, the input of which is connected to the output of the comparator 68. Therefore, when wheel deceleration drops below the $G_2$ reference level, one-shot 86 will be fired, thereby transmitting a signal to an input of the AND gate 84. The other input to the AND gate 84 is connected to the output of a comparator 85, which compares the value of the wheel speed signal with some predetermined reference value, and generates an output signal to the AND gate 84 whenever wheel speed drops below the reference value. Therefore, the flip-flop 46 will be reset whenever either the AND gate 84 or the comparator 78 produces an output signal. Resetting of the flip-flop 46, of course, terminates the signal to the solenoid 20 since the signal to one of the inputs of the AND gate 48 will have been extinguished.

The wheel slip function is defined as $1 - V_w/V_r$, where $V_w$ is the wheel speed sensed by the wheel speed sensor 12 and $V_r$ is a reference velocity to be further defined hereinafter. The input of a memory element 88 is connected to the output of the wheel speed sensor 12, through the appropriate processing equipment (not shown). The output of an OR gate 92 is connected to the track input of memory element 88. One input of the OR gate 92 is connected to the output of a flip-flop 108; the other input of the gate 92 is connected to the inverted output of the flip-flop 46. The memory unit 88 therefore normally stores the first value of a signal transmitted to the input terminal 90 of the latter after initiation of an adaptive braking cycle; and when a signal is generated by flip-flop 108. The output of the memory element 88 is transmitted to the input of a divider 94, the other input of which is connected to the input of the wheel speed sensor 12. The divider 94 divides the wheel speed generated by the wheel sensor 12 by the value stored in the memory element 88. The output signal of the divider 94 is transmitted to the input of the amplifier 96, which subtracts the value of the output of the divider 94 from unity, to form the quantity of $1 - V_w/V_r$, which was defined hereinabove as the wheel slip. This wheel slip quantity is multiplied by a constant $K_3$ in the multiplier 98 and then is transmitted to one of the input terminals of the duty-cycle generator 18. The output of the amplifier 96 is also multiplied by a constant $K_4$ in the multiplier 100, the output of which is connected to one input of a summer 102. The other input of the summer 102 is connected to the output of a memory element generally indicated by the numeral 104, the input of which is connected to the output of the error term generator 22. The memory element 104 normally tracks the value of the output signal of the error term generator 22, but stores this value whenever a signal is transmitted to the store input 103 of the memory element 104. Store input 103 is connected to the output of the one-shot 86, so that the memory 104 stores the value of the error term generator 22 when the one-shot 86 is fired by wheel acceleration dropping below the $G_2$ reference level. The one-shot 86 also closes a switch 106, which connects the output of the summer 102 with the initial condition input 66 of the error term generator 22. Therefore, on the initial adaptive braking cycle, the intial condition of the error term generator 22 is set by the output of the integrating amplifier 50, but on succeeding antiskid cycles, the initial condition of the error term generator 22 is set as a function of the sum of the wheel slip term, (the output of the amplifier 96), and the value of the output of the error term generator 22. This initial condition is reset by the one-shot 86, which is fired whenever the wheel deceleration drops below the $G_2$ reference level, and therefore the initial condition on the error term generator 22 is reset whenever wheel deceleration drops below the $G_2$ reference level.

The output of the one-shot 86 also sets a flip-flop 108, the output of which is transmitted to the one input of an OR gate 92, the output of which is connected to the track input of the memory element 88. Therefore, immediately after the switch 106 is closed to establish the initial condition on the error term generator 22, the memory element 88 begins to track the actual wheel speed. Since the output of the divider 94 will be unity as long as the memory element 88 is tracking the wheel speed, the wheel slip term is set equal to zero immediately after the wheel acceleration drops below the $G_2$ reference level and remains equal to zero until the flip-flop 108 is reset. The reset input of the flip-flop 108 is connected to the output of the comparator 40, so the flip-flop 108 will be reset whenever the wheel deceleration drops below the $G_1$ reference level. This extinguishes the output of the flip-flop 108 to the track input 92, thereby causing the memory element 88 to memorize the existing value of wheel speed, which is used in the slip calculations accomplished by the divider 94 and amplifier 96 until the value of the wheel deceleration again drops below the $G_2$ wheel reference level from a value higher than the $G_2$ reference level.

The output signal of the comparator 40 also closes a switch 110, to transmit the value of the signal on the terminal 112 to the duty-cycle generator whenever the wheel deceleration drops below the $G_1$ level, and to remove this signal whenever the value of the deceleration signal climbs above the $G_1$ level.

Therefore, the output signal generated by the duty-cycle generator 18 will be a function of the sum of the various input signals to the latter. For example, the input signal transmitted to input 114 of the duty-cycle generator 18 will be a predetermined amount when the wheel deceleration is below the $G_1$ level, and will be zero when wheel deceleration is above the $G_1$ level. The signal transmitted to the input terminal 116 of duty-cycle generator 18 will be a function of wheel slip, defined as the quantity $1 - V_w/V_r$, where $V_w$ is the instantaneous wheel velocity and $V_r$ is a reference wheel velocity. The signal transmitted to input terminal 118 of the duty-cycle generator 18 is equal to the output signal of the error term generator 22. Finally, the signal transmitted to the input terminal 120 of duty-cycle generator 18 will be a function of the wheel acceleration and deceleration, as generated by the differentiator 14.

Figure 4:
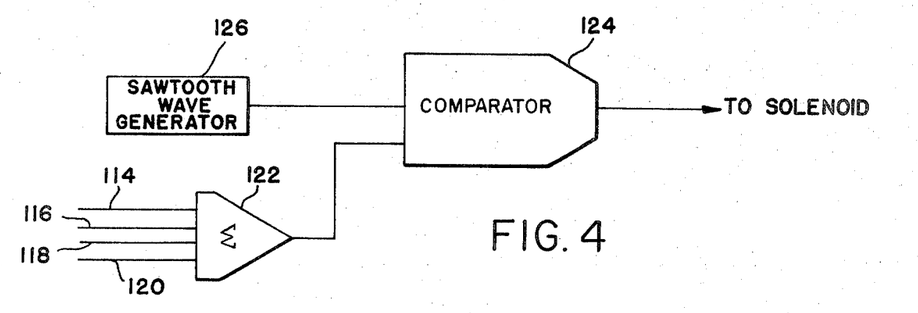
FIG. 4 is a detailed block diagram illustrating the operation of the duty-cycle translator used in our adaptive braking system.
Figure 5:
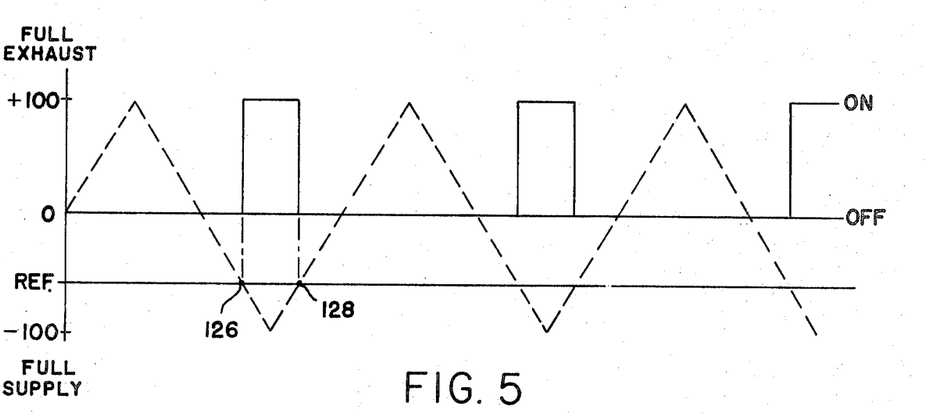
FIG. 5 is a graphical representation of the manner in which pulses are generated by the duty-cycle generator.

Referring now to FIGS. 4 and 5, the duty-generator 18 is described in detail. Generator 18 includes a summer 122 which sums the value of the signals appearing in the input terminals 114, 116, 118, and 120. The output of the summer 122 is transmitted to the reference terminal of a comparator 124. The input of the latter is connected to the output of a sawtooth wave generator 126. The sawtooth wave generator 126 produces a sawtooth wave output, the amplitude of which is equal to the predetermined maximum permissible amplitude of the sum of the input signals from the summer 122, and the frequency of which is also a predetermined value. The comparator 124 compares the sawtooth wave with the reference signal which is equal to the output of the summer 122. Referring now to FIG. 5 of the drawings, the output of the sawtooth generator is shown by the dashed lines. Assigning an arbitrary value of plus 100 to the maximum value of the sawtooth wave, and a similar arbitrary value of minus 100 to the minimum value of the sawtooth wave, the amplitude of th output signal of the summer 122 must be equal to either plus or minus 100, or to some intermediate value. For example, a value of plus 100 for the sum of the various signals on the terminals 114–120 would call for the solenoid 20 to be on continually, thereby rapidly exhausting the brake pressure in the vehicle brake actuators. Similarly, the arbitrary value of minus 100 would call for the solenoid to be off at all times, permitting unrestricted communication between the brake actuators and the brake pressure supply, so that braking pressure would build quite rapidly. Various intermediate values would call for different proportions of exhaust and supply. As illustrated in FIG. 5, assuming that the input to the reference terminal of the comparator 124 is equal to the minus 70 points, the output of the comparator 124 will produce an output signal only when the value of the sawtooth wave is below minus 70 points, as occurs between points 126 and 128 on FIG. 5. Therefore, the solenoid will be on through a much smaller portion of the cycle than the solenoid will be off. As is readily apparent to those skilled in the art, if the signal to the reference input of the comparator 124 is above zero, the solenoid 20 will be on more than it will be off, and if the input to the reference terminal of comparator 124 is below zero, the solenoid 20 will be off for a longer period of time during each cycle than it will be on. Similarly, if the value to the reference input of the comparator 124 is equal to zero, the solenoid 20 will be on and off for substantially equal periods of time. In other words, when the value of the reference signal is below zero, braking pressure will be established at a higher level; if the value of the signal transmitted to the reference terminal of comparator 124 is above zero, braking pressure will be established at a lower level. It should be remembered, of course, that braking pressure is decayed when the solenoid is on and is increased when the solenoid is off.

Figure 6:
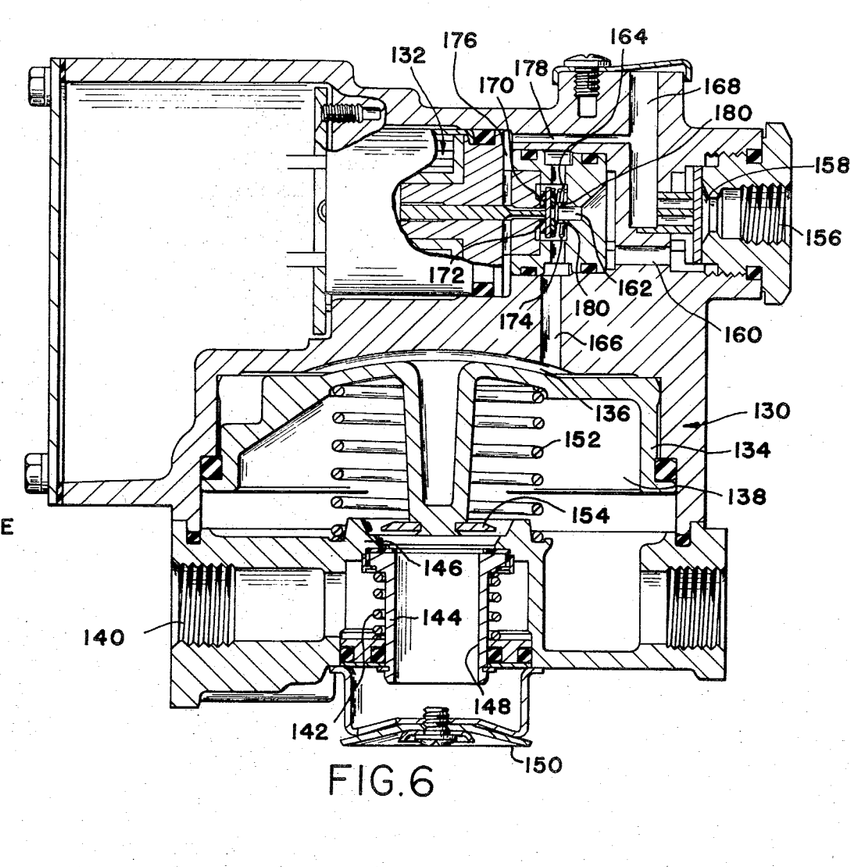
FIG. 6 is a cross-sectional view of a modulator made pursuant to the teachings of our present invention.

Referring now to FIG. 6, the modulator which controls braking pressure in response to the output signal of the duty-cycle generator 18 is shown in detail. Generally, the modulator includes a conventional air-brake relay valve generally indicated by the numeral 130, with a solenoid valve generally indicated by the numeral 132 controlling fluid communication into the primary chamber 136 of the relay valve 130. The relay valve 130 includes a conventional piston 134 which is slidably mounted within the relay valve housing and which divides the latter into a primary chamber 136 and secondary chamber 138, which is communicated to the appropriate vehicle brake actuators (not shown). An inlet port 140 is communicated to a source of air pressure. A spring 142 yieldably urges a first valve member 144 into sealing engagement with a valve seat 146, to thereby prevent fluid communication between the inlet port 140 and the secondary chamber 138. The valve member 144 defines a passage 148 therewithin, which normally communicates the chamber 138 to the atmosphere through the exhaust port 150. A spring 152 yieldably urges the piston 134 upwardly viewing FIG. 6, but when a sufficient fluid pressure level is generated in the primary chamber 136 to overcome the force of the spring 152, a valve seat 154 carried by the piston 134 is urged into sealing engagement with the valve member 144 to thereby terminate fluid communication between the valve secondary chamber 138 and the exhaust port 150, and to thereafter urge the valve member 144 out of sealing engagement with the valve seat 146, against the bias of the spring 142. When this occurs, the fluid pressure at the inlet 140 is communicated into the secondary chamber 138 and thereafter to the aforementioned brake actuators. Since the valve members 144, 146, 154, are capable of modulation, the fluid pressure level communicated to the vehicle brake actuators will be equal to the fluid pressure communicated into the primary chamber 136. Another inlet port 156 is connected to the conventional brake valve (not shown) of the vehicle, which is adapted to communicate pressure fluid to the inlet port 156 whenever a brake application is effected. Whenever this occurs, and in the absence of an adaptive braking cycle, fluid flows around the edges of the quick release valve 158, through the passages 160, 162 and into the chamber 164, and from the chamber 164 into the primary chamber 136 through a passage 166, to thereby actuate the brakes of the vehicle. When the brakes of the vehicle are released, the fluid pressure level at the inlet port 156 is reduced, thereby permitting the high fluid pressure level in the primary chamber 136 to communicate back through the passages desribed hereinabove to the quick-release valve 158. The high pressure fluid urges the quick release valve 158 to the right viewing FIG. 6, thereby permitting the high pressure air to escape into the atmosphere through the exhaust port 168. A valve element 170 is slidably mounted in the chamber 164, and is yieldably urged to the left viewing the Figure into sealing engagement with a valve seat 172 by a spring 174. Engagement of the valve element 170 with the valve seat 172 prevents fluid communication between the passage 166 and the passages 176 and the passages 176 and 178 which connect with the exhaust port 168. However, when the solenoid valve 132 is actuated, the armature of the latter urges the valve element 170 into sealing engagement with the valve seat 180, thereby terminating fluid communication from the inlet port 156 into the passage 166, and permitting the fluid pressure to escape from the latter to the external atmosphere via passages 176 and 168. Therefore, it can be seen that as long as the solenoid valve 132 is not actuated, braking pressure in the vehicle's brake actuators may build, but during actuation of the solenoid valve 132, braking pressure in the vehicle's brake actuators will be released. As illustrated in FIG. 6, the solenoid valve 132 is capable of turning on and off almost instantaneously, so that it is both on and off several times per second when an adaptive braking cycle is initiated. This permits very close control of the braking pressure. In other words, during periods of sharp wheel acceleration, the braking pressure is permitted to build rapidly so that the wheels may be retarded; however, when the wheel decelerates rapidly, indicating that a skidding condition is imminent, the braking pressure is exhausted rapidly. Of course, as pointed out in the description of the circuit of FIG. 1, many other factors are considered by the duty-cycle generator 18 in the determination of precise rates of brake pressure build and decay.

MODE OF OPERATION

Figure 3:
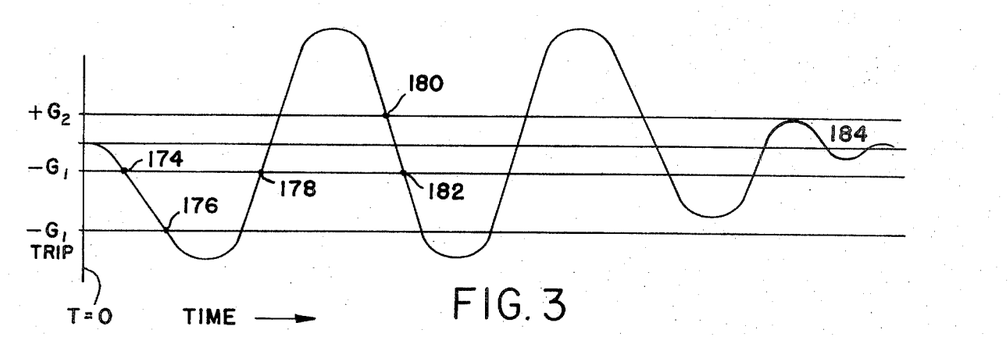
FIG. 3 is a graphical representation of the cyclic operation of our system.

In operation, and referring particularly to FIGS. 1 and 3, the wheel speed sensor 12 measures the wheel rotational velocity. Assuming a brake application is initiated by the vehicle operator at a time $t = 0$ in FIG. 3, the differentiator 14 produces an output signal proportional to the acceleration and deceleration of the control wheel. As illustrated in FIG. 3, the wheel begins to decelerate and when the wheel deceleration passes through the $G_1$ reference level, as indicated in FIG. 3 at point 174, the comparator 40 produces an output signal which closes the switch 54 and thereby initiates the integrating amplifier 50 which then decays the initial condition set at terminal 52 of the latter in a predetermined manner. When the wheel deceleration passes through the $G_{trip}$ level, as indicated by point 176 in FIG. 3, the output of comparator 42 produces an output signal which sets the flip-flop 46 which initiates the adaptive braking cycle. Of course, had the wheel deceleration remained in the band between $G_1$ and $G_{trip}$ for a sufficient length of time, the comparator 58 would have produced an output signal which would have set the flip-flop 46. In any even when the flip-flop 46 is set, one-shot 62 is fired to close the switch 64 sets the initial condition on terminals 66 of error term generator 22 equal to the output signal of the integrating amplifier 50. At the same time, the wheel deceleration is multiplied by the constant $K_1$ by multiplier 16 and transmitted to the duty-cycle generator 18. This wheel acceleration or deceleration signal is also multiplied by the constant $K_2$ by multiplier 24 and fed into the error term generator 22. Upon the setting of flip-flop 46, the memory element 88 memorizes the instantaneous wheel speed. On the subsequent antiskid cycle, this wheel speed is used as a reference velocity in calculating wheel slip, which is also fed into the duty-cycle generator 18 after being multiplied by a constant $K_3$ by multiplier 98. As described hereinabove, the duty-cycle generator generates a pulse train in which the width of the pulses are modulated according to the magnitudes of the input signals on terminals 120, 118, 116, and 114.

As long as the wheel is decelerating, the output of duty-cycle generator will cause the solenoid 20 to exhaust braking pressure for a substantial portion of the cycle, to permit the wheel to reaccelerate. When the wheel reaccelerates past the minus $G_1$ level, as indicated by point 178 in FIG. 3, the AND gate 72 produces an output signal which closes switch 74, thereby causing the output signal of the error term generator 22 to decay at a predetermined rate. However, since wheel acceleraton rapidly passes through the band defined between the minus $G_1$ and plus $G_2$ acceleration levels, the output signal of the error term generator 22 does not decay for a sufficient amount to cause the comparator 78 to produce an output signal and the adaptive braking mode of operation continues. As the wheel acceleration becomes positive, the various inputs to the duty-cycle generator will cause the pulse train to be modulated in such a manner that the solenoid 20 permits braking pressure to build much faster than it decays, thereby again decelerating the controlled wheel. When the wheel deceleration drops below the $G_2$ level as indicated by the point 180 on FIG. 3, one-shot 86 is fired which enables memory element 104 to store the instantaneous value of the output signal of the error term generator 22. Also, the one-shot 86 closes switch 106, which causes the output of summer 102, which is the sum of the values stored in the memory elment 104 plus the slip calculated by amplifier 96 multiplied by the constant $K_4$ in multiplier 100, to be transmitted to the initial condition terminal 66 of the error term generator 22. Therefore, the output signal of the generator 22 is set equal to this value at that instant. Furthermore, the one-shot 86 sets flip-flop 108 which causes the memory element 88 to track the velocity of the controlled wheel. Therefore, wheel slip after the wheel deceleration drops below the $G_2$ level, as at point 180, is set equal to zero. As illustrated in FIG. 3, the wheel deceleration continues to decrease, and when it drops below the minus $G_1$ reference level, as indicated by point 182 in FIG. 3, the output of comparator 40 resets the flip-flop 108 so that the memory element 88 memorizes the instantaneous value of the wheel velocity. This value is used in the wheel slip calculations accomplished by the divider 94 and amplifier 96 until the track input 92 of the memory element 88 is again initiated by the wheel deceleration dropping below the $G_2$ level.

The output of the one-shot 86 is also transmitted to one input of the AND gate 84. Of course, the other input of the AND gate 84 is connected to the output of the comparator 85, so that if the wheel velocity is less than some predetermined amount and the wheel declerates below the $G_2$ level as represented by point 180 in FIG. 3, AND gate 84 will generate an output signal which resets the flip-flop 46 to thereby terminate the adaptive brake mode of operation. It should be noted that wheel velocity will be close to the maximum value in that cycle when the wheel decelerates past the point 180, since point 180 occurs just before the wheel agains begins to decelerate. Therefore, the adaptive braking cycle is terminated whenever the maximum wheel velocity in any cycle is below some predetermined minimum value.

The adaptive braking system in its adaptive mode operates as described above for any necessary number of cycles to prevent the wheel from locking or until the vehicle is brought to a safe stop. Of course, after the system is operated for a predetermined number of cycles, the wheel deceleration should eventually be controlled to such an extent that it remains in the band defined between the minus $G_1$ and plus $G_2$ wheel deceleration levels, unless of course, the vehicle has been brought to a stop in the interim. Beginning at the point 184 on FIG. 3, for example, the wheel deceleration and acceleration remains within the band defined between the minus $G_1$ and plus $G_2$ reference levels. When this occurs the AND gate 72 closes switch 74 to cause the error team generator output signal to decay at some predetermined function. The comparator 78 compares this output signal with some predetermined reference value, and when the output signal of the generator 22 drops below this reference value, the flip-flop 46 is reset to thereby terminate the adaptive braking cycle. Of course, if the value of the wheel acceleration signal is such that the output signal of the error term generator 22 becomes less than the value on terminal 80, the comparator 78 will also terminate the adaptive braking cycle.

It will be noted that when the wheel decelerates past the minus $G_2$ level the output of the comparator 40 closes the switch 110 to add a signal of predetermined magnitude to the input of duty-cycle generator 18. This feature is optional, and merely "forces" the duty-cycle generator to bias the valve 20 toward decay whenever wheel deceleration drops below the $G_1$ level. Of course, when the wheel deceleration is above the $G_1$ level, the switch 110 is again opened, thereby removing the signal from the terminal 114 of duty-cycle generator 18.

We claim:

1. In a vehicle having a wheel and a brake for braking said wheel, an adaptive braking system for controlling actuation of said brake comprising:
   means for generating a first signal proportional to the rotational velocity of said wheel;
   means responsive to said first signal for generating a second signal proportional to acceleration and deceleration of said wheel;
   control means responsive to the value of said second signal for generating a control signal for controlling actuation of said brake;
   means for generating a first reference signal corresponding to a first value of said second signal and a second reference signal corresponding to a second value of said second signal, said first reference signal corresponding to a higher value of said second signal than the value of said second signal represented by said second reference signal;
   means for comparing said second signal with said first and second reference signals and generating an output signal when the value of said second signal is less than said first reference signal and greater than said second reference signals, said comparing means terminating said output signal when the value of said second signal is greater than said first reference signal or less than said second reference signal including means for terminating said output signal whenever the value of the second signal is not in the band defined between said first and second reference signals; and
   means for extinguishing said control signal when said output signal is generated for a sufficiently long time period.

2. The invention of claim 1:
   means for generating a speed reference signal corresponding to a predetermined value of said first signal; and
   said extinguishing means including means for extinguishing said control signal when the value of said first signal drops below said speed reference signal and the value of said second signal drops below said first reference signal.

3. The invention of claim 1:
   said first reference signal having a value corresponding to a positive value of said second signal, said second reference signal having a value corresponding to a negative value of said second signal.

4. The invention of claim 1; and
   means for generating a third reference signal corresponding to a value of said second signal substantially less than the value represented by said second reference signal;
   said control means comparing said second signal with said third reference signal and initiating said control signal when said second signal drops below said third reference signal.

5. The invention of claim 4:
   said control means including means initiating said control signal when the value of said second signal remains in the band defined between the values of said second and third reference signals for a predetermined period of time.

6. The invention of claim 4:
   said control means including means for adjusting the value of said control signal in accordance with the length of the time period in which the value of said second signal remains in the band defined between said second and third reference signals.

7. The invention of claim 1:
   means for generating a reference velocity signal; and
   means for generating a slip signal, said slip signal being a function of said first signal and of said reference velocity signal;
   said control means including means for adjusting the value of said control signal in accordance with the value of said slip signal.

8. The invention of claim 7:
   said reference velocity generating means including means responsive to a decrease in the value of said second signal to the level of said first reference signal to equate the value of said reference velocity signal with the value of said first signal.

9. The invention of claim 1:
   means responsive to a function of the value of said second signal for generating an error signal;
   said control means being responsive to said error signal to vary the value of said control signal as a function of the value of said error signal;
   said extinguishing means including means responsive to said output signal to decay the value of said error signal in a predetermined manner during generation of said output signal, and means comparing said error signal with an error reference signal of a predetermined value, said comparing means terminating said control signal when the value of said error signal drops below said error reference signal.

10. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating first and second reference signals, said second reference signal representing a level substantially less than that represented by said first signal;

means for comparing said second signal with said second reference signal and generating a control signal for controlling actuation of said brake when said second signal drops below said second reference signal; and means for adjusting the value of said control signal in accordance with the length of the time period that the value of the second signal remains in the band defined by said first and second reference signals before dropping below said second reference signal.

11. The invention of claim 10:

means comparing said second signal with said first reference signal and generating a first intermediate signal when the value of said second signal drops below the value of said first reference signal;

means responsive to said first intermediate signal to generate a second intermediate signal decaying in a predetermined manner; and means comparing said second intermeidate signal with an intermeidate reference signal and generating said control signal when the value of said second intermediate signal drops below the value of the said intermediate reference signal.

12. The invention of claim 10:

means comparing said second signal with said first reference signal and generating a first intermediate signal when the value of said second signal drops below the value of said first reference signal;

means resposive to said first intermediate signal to generate a second intermediate signal decaying in a predetermined manner; and means responsive to a function of the value of said second signal for generating an error signal;

said control means being responsive to said error signal to vary the value of said control signal as a function of the value of said error signal; and means responsive to generation of said control signal to set the initial value of said error signal equal to the value of said intermediate signal when said control signal is generated initially.

13. In a vehicle having a wheel and a brake for braking said wheel, and adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal;

control means responsive to the values of said second signal and of said error signal for generating a control signal for controlling actuation of said brake;

means for generating a reference velocity signal;

means for generating a slip signal, said slip signal being a function of said first signal and of said reference velocity signal;

said control means including means for adjusting the value of said control signal in accordance with the value of said slip signal, said error signal, and said second signal; and means for generating a first reference signal corresponding to a first value of said signal and a second reference signal corresponding to a second value of said second signal;

said reference velocity generating means being responsive to a decrease in the value of said second signal to said first reference signal to equate the value of said reference velocity signal with the value of said first signal.

14. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal; and control means responsive to the values of said second signal and of said error signal for generating a control signal for controlling actuation of said brake;

means for generating a first reference signal corresponding to a first value of said second signal and a second reference signal corresponding to a second value of said second signal; and means for decaying said error signal when the value of said second signal is in the band defined between said first and second reference values.

15. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal; and control means responsive to the values of said second signal and of said error signal for generating a control signal for controlling actuation of said brake;

means for generating a first reference signal corresponding to a first value of said second signal, a second reference signal corresponding to a second value of said reference signal less than the value of said first reference signal, and a third reference signal corresponding to a third value of said second signal less than the value of said second reference signal;

said control signal generating means generating said control signal when the value of said second signal drops below said third reference signal;

said error signal generating means including means for establishing an initial value of said error signal in accordance with the length of the time period that said second signal remains in the band defined between said second and third reference signals before dropping below the third reference signal.

16. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal;

control means responsive to the values of said second signal and of said error signal for generating a control signal for controlling actuation of said brake; and means for generating a first reference signal corresponding to a first value of said second signal, a second reference signal corresponding to a second value of said reference signal less than the value of said first reference signal, and a third reference signal corresponding to a third value of said second signal less than the value of said second reference signal;

said control signal generating means generating said control signal when the value of said second signal remains in the band defined between said second and third reference signals for a predetermined time period.

17. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal;

control means responsive to the values of said second signal and of said error signal for generating a control signal for controlling actuation of said brake; and means for generating a first reference signal corresponding to a first value of said second signal and a second reference signal corresponding to a second value of said second signal;

said control signal generating means including means for changing the value of said control signal by a constant amount which does not vary despite fluctuations in the value of said second signal or said error signal when the value of said second signal drops below the value of said second reference signal.

18. The invention of claim 17:

said initial value of said error signal being further a function of the value of said error signal when said second signal drops to the value of said first reference signal.

19. The invention of claim 17:

said reference velocity generating means being responsive to a decrease in the value of said second signal to said first reference signal to equate the value of said reference velocity signal with the value of said first signal.

20. In a vehicle having a wheel and a brake for braking said wheel, an adaptive braking system for controlling actuation of said brake comprising:

means for generating a first signal proportional to the rotational velocity of said wheel;

means responsive to said first signal for generating a second signal proportional to acceleration and deceleration of said wheel;

means for generating an error signal proportional to the time integral of a function of the value of said second signal;

control means responsive to the values of said second signal and of said error signal for generating a control signal for controlling actuation of said brake; and means for generating a first reference signal corresponding to a first value of said second signal and a second reference signal corresponding to a second value of said second signal;

said error signal generating means including means for establishing an initial value of said error signal when the value of said second signal drops to said first reference level, said establishing means including means for storing the value of said error signal when said second signal drops to said first reference signal and establishing the value of said error signal as a function of said stored value of the error signal.

* * * * *